(12) United States Patent
Bloechl et al.

(10) Patent No.: US 6,501,895 B1
(45) Date of Patent: *Dec. 31, 2002

(54) OPTICAL DEVICE WITH A DEFINED TOTAL DEVICE STRESS AND METHOD FOR MANUFACTURING IT

(75) Inventors: Peter Bloechl, Adliswil (CH); Gian-Luca Bona, Hedingen (CH); Roland W. Germann, Wangen (CH); Horst Folkert, Kilchberg (CH); Illana Massarek, Thalwil (CH); Bert Jan Offrein, Langnau (CH); Huub L. Salemink, Waedenswil (CH); Dorothea W. Wiesmann, Zurich (CH)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/663,884

(22) Filed: Sep. 15, 2000

(30) Foreign Application Priority Data

Jun. 29, 1998 (EP) .............................. 98111956

(51) Int. Cl.$^7$ ................................. G02B 6/10
(52) U.S. Cl. .................. 385/129; 385/130; 385/123; 385/11
(58) Field of Search .................... 385/129–132, 385/123–126, 11, 128; 65/403, 386

(56) References Cited

U.S. PATENT DOCUMENTS

| 4,358,181 A | * | 11/1982 | Gulati et al. ................. 385/124 |
| 4,724,316 A | * | 2/1988 | Morton .................... 385/128 X |
| 4,781,424 A | * | 11/1988 | Kawachi et al. ............ 385/132 |
| 4,871,221 A | * | 10/1989 | Imoto .......................... 38/130 |
| 5,502,781 A | * | 3/1996 | Li et al. ................. 385/132 X |

OTHER PUBLICATIONS

Maruo et al. "Embedded Channel Polyimide Waveguide Fabrication by Direct Electron Beam Writing Method", IEEE 1995, vol. 13, No. 8 Aug. 1995.*

* cited by examiner

Primary Examiner—Phan T. H. Palmer
(74) Attorney, Agent, or Firm—Manny W. Schecter

(57) ABSTRACT

An optical device with a defined total device stress ($\sigma_{10}$) and a therefrom resulting defined birefringence in order to obtain a well defined optical polarization dependence is proposed. It comprises a lower cladding layer (3) with a first refractive index ($n_3$), thereon an upper cladding layer (5) with a second refractive index ($n_5$) and between an optical waveguide core (4) with a third refractive index ($n_4$) which is bigger than the first refractive index ($n_3$) and the second refractive index ($n_5$). The optical waveguide core (4) has a waveguide core stress ($\sigma_4$) resulting from the manufacturing process and the upper cladding layer (5) is manufactured to have an inherent cladding layer stress ($\sigma_5$) which together with the waveguide core stress ($\sigma_4$) results in the total device stress ($\sigma_{10}$).

4 Claims, 2 Drawing Sheets

OPTICAL DEVICE WITH A DEFINED TOTAL DEVICE STRESS AND METHOD FOR MANUFACTURING IT

The invention relates to an optical device with a defined total device stress and a therefrom resulting defined birefringence and consequently a well defined optical polarization dependence. More particularly the invention relates to an waveguide core stress and the cladding layer stress sum up to a total device stress with a desired distribution. More particularly, this distribution being such that the optical mode(s) in the waveguides do not experience any birefringence and such that the polarization dependence is minimized or set to a desired, well defined value.

TECHNICAL FIELD AND BACKGROUND OF THE INVENTION

In the article "Characterization of Silicon-Oxynitride Films deposited by Plasma Enhanced CVD" by Claassen, v.d. Pol, Goemans and Kuiper in J. Electrochem. Soc.: Solid state science and technology, July 1986, pp 1458–1464 the composition and mechanical properties of silicon-oxynitride layers made by plasma-enhanced deposition using different gas mixtures are investigated. It is stated that the mechanical stress strongly depends on the amount of oxygen and hydrogen incorporated in the layer. Heat treatment at temperatures higher than the deposition temperature leads to a densification of the film due to hydrogen desorption and cross-linking.

In "Temperature dependence of stresses in chemical vapor deposited vitreous films" by Shintani, Sugaki and Nakashima in J. Appl. Phys. 51(8), August 1980, pp 4197–4205 its is shown that in vitreous silicate glass depending on deposition background pressure different components of tensile and compressive stress occur. Also a hysteresis of the stress is observed.

In "Stress in chemical-vapor-deposited $SiO_2$ and plasma-$SiN_x$ films on GaAs and Si" by Blaauw in J. Appl. Phys. 54(9), September 1983, pp 5064–5068 stress in films of $CVD-SiO_2$ and plasma-$SiN_x$ on GaAs is measured as a function of temperature. Different properties of the stress are observed depending on e.g. film thickness, doping and annealing parameters. "Stress in silicon dioxide films deposited using chemical vapor deposition techniques and the effect of annealing on these stresses" by Bhushan, Muraka and Gerlach in J. Vac Sci. Technol. B 8(5), Sep/Oct 1990, pp 1068–1074 deals with in situ measured stress as a function of annealing temperature. Different deposition techniques are investigated and in PECVD silica films on silicon substrates a change of the stress sign from tensile to compressive is observed with rising annealing temperature.

U.S. Pat. No. 4,781,424 is related to a single mode optical waveguide having a substrate, a cladding layer formed on the substrate, a core portion embedded in the cladding layer, and an elongated member for applying a stress to the core portion or a stress relief groove for relieving a stress from the core portion in the cladding layer along the core portion. The position, shape and material of the elongated member or the groove are determined in such a way that stress-induced birefringence produced in the core portion in accordance with a difference in thermal expansion coefficient between the substrate and the single mode optical waveguide is a desired value.

In U.S. Pat. No. 5,502,781, integrated optical devices which utilize a magnetostrictively, electrostrictively or photostrictively induced stress to alter the optical properties of one or more waveguides in the device are disclosed. The integrated optical devices consist of at least one pair of optical waveguides preferably fabricated in a cladding material formed on a substrate. A stress applying material, which may be a magnetostrictive, electrostrictive or photostrictive material, is affixed to the upper surface of the cladding material near at least one of the optical waveguides. When the appropriate magnetic, electric or photonic field is applied to the stress applying material, a dimensional change tends to be induced in the stress applying material. The constrained state of the stress applying material, however, caused by its adhesion to the cladding material, causes regions of tensile and compressive stress, as well as any associated strains, to be created in the integrated optical device. By positioning one or more optical waveguides in a region of the device which will be subjected to a tensile or compressive stress, the optical properties of the stressed waveguide may be varied to achieve switching and modulation. Latchable integrated optical devices are achieved by utilizing a controlled induced stress to "tune" one or more waveguides in an integrated optical device to a desired refractive index or birefringence, which will be retained after the field is removed.

U.S. Pat. No. 4,358,181 discloses a method of making a preform for a high numerical aperture gradient index optical waveguide. Therein the concentration of two dopant constituents is changed during fabrication. Concentration of the first dopant, germanium (Ge), is changed radially as the preform is built up in order to produce the desired radial refractive index gradient. The concentration of the second dopant, boron (B), is changed radially to compensate for the radial change in thermal expansion coefficient caused by the varying Ge concentration. B is added to the cladding layer to make the thermal expansion coefficient of the cladding equal to or greater than the composite thermal expansion coefficient of the core. The magnitude of residual tension at the inner surface caused by thermal expansion gradients is reduced and premature cracking of the preform is eliminated.

Disclosed in U.S. Pat. No. 4724316 is an improved fiber optic sensor of the type in which a fiber optic waveguide component of the sensor is configured to be responsive to an external parameter such that curvature of the fiber optic waveguide is altered in response to forces induced by changes in the external parameter being sensed. The alteration of the curvature of the fiber optic waveguide causes variations in the intensity of light passing therethrough, these variations being indicative of the state of the external parameter. The improvement comprises coating material covering the exterior portion of the fiber optic waveguide, the coating material having an expansion coefficient and thickness such that distortion of the fiber optic waveguide caused by thermally induced stresses between the coating material and the glass fiber is substantially eliminated. Also disclosed is a support member for supporting the curved fiber optic waveguide, the support member and fiber optic waveguide being configured and arranged to minimize the effects of thermal stress tending to separate the waveguide from the support member.

OBJECT AND ADVANTAGES OF THE INVENTION

It is an object of the invention according to claim 1 to provide an optical device with a defined total device stress and a therefrom resulting defined birefringence, which device is easy to manufacture and at the same time provides a high precision in the resulting birefringence value with the final intent to obtain a well defined optical polarization dependence for the optical mode propagating in the device.

The optical device with the features according to claim 1 has the advantage that the propa-gation properties of the therein guided optical mode(s) can be tailored according to the appropriate needs imposed by the application, e.g., no polarization sensitivity in a conventional photonic component with the advantage that the state of polarization need not be controlled in a practical system.

The waveguide stress can result from an annealing process, which has the advantage that it can be used for the extraction of hydrogen from the waveguide core which decreases hydrogen-bond induced losses. When referring to an annealing process or an annealing step, a well defined technological processing procedure is meant in which the device to be fabricated is e.g. heated in a furnace with a well controlled temperature profile and subsequently cooled down. When the cladding layer stress is tunable by variation of the temperature of an annealing step or the concentration of an additive material, the advantage arises that with a relatively simple process the stress can be controlled accurately. This is particularly useful when the stress of the waveguide core is predetermined by other parameters such as the desired refractive index and the maximum allowed optical losses. On the other hand, if the waveguide core stress is tunable by variation of the temperature of an annealing step or the concentration of an additive material, the vice versa effecting advantage can be utilized in that eventual restrictions which determine the stress of the cladding layer, can be followed and the desired value of birefringence can be controlled via the tunability of the waveguide core stress.

It is of greatest advantage when the cladding layer stress is tunable to the tensile as well as to the compressive stress range, since then a big flexibility in processing the waveguide core is achieved because the resulting waveguide core stress can be negative as well as positive and still nearly any desired value of resulting total device stress can be obtained. This proves advantageous when the cladding layer stress is settable opposite to the waveguide core stress, such that the most desired no-birefringence device can be realised by stress compensation.

Quite in contrast to other approaches to avoid stress in planar devices, like fabricating stress relief grooves, no complex processing steps like an additional lithographic mask and etching step are required here. Annealing steps as described here are easily controllable and usually are needed anyway. They do hence neither introduce additional complexity nor costs.

SUMMARY OF THE INVENTION

The propagation behaviour of the optical modes in a waveguide should be controlled accurately because in many applications the state of polarization critically determines device performance. On the other side, in today's optical communication systems using single mode waveguides the propagation of TE and TM modes should be as similar as possible in order to have negligible polarization dependence such that consequently polarization control can be neglected. A difference in the refractive index for TE and TM modes in a wave guiding structure—a birefringence— leads to polarization-dependent effects in an optical component. Hence, the birefringence in an optical waveguide is one of the important factors which determines performance of a waveguide type optical component part, so that it is desirable to control the birefringence value with a high degree of accuracy.

Aside from the birefringence induced by the waveguide geometry, the major contribution to the birefringence is induced by the stress in the layered stack of the wave guiding material. Birefringence induced by the waveguide geometry is typically a few times $10^{-4}$ whereas the stress-induced birefringence is in many cases an order of magnitude larger. It is hence of importance to accurately control these values for practical applications, e.g., in single-mode optical communication components.

The invention provides an optical device with a defined total device stress and a therefrom resulting defined birefringence and controlled polarization sensitivity. When manufacturing a waveguide structure, comprising a substrate of silicon with an oxide layer and a SiON waveguide core thereupon, followed by a silica cladding layer a certain amount of stress builds up during annealing of the SiON core layer. This is mainly due to the difference of the different thermal expansion coefficients in the layers. The annealing step is used for extraction of hydrogen from the SiON in order to achieve low losses. The cladding layer made of silica then can be created and annealed such that this layer exhibits a cladding layer stress. The cladding layer stress and the waveguide core stress can be advantageously used to compensate each other such that the total device stress is minimized. This leads to a minimized birefringence which is fully compensated by properly designing the waveguide geometry. The extinction of the birefringence results in a minimized polarisation dependence of the optical device.

When the cladding layer stress has the opposite sign to the waveguide core stress, the waveguide core stress is counteracted by the cladding layer stress. Since both stress types, tensile and compressive, can be added in arbitrary combinations, a desired value of total device stress can be reached, thereby making the optical device viable also as device with a desired non-zero-value of birefringence and hence, with a defined polarization dependence, e.g., to built an optical mode converter.

DESCRIPTION OF THE DRAWINGS

Examples of the invention are depicted in the drawings and described in detail below by way of example. It is shown in FIG. 1 the cross-section of a waveguide, FIG. 2 a schematic diagram of the dependence of stress in SiON on refractive index after annealing, FIG. 3 a schematic diagram of the resulting stress in $SiO_2$ as deposited by PECVD depending on the annealing temperature.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
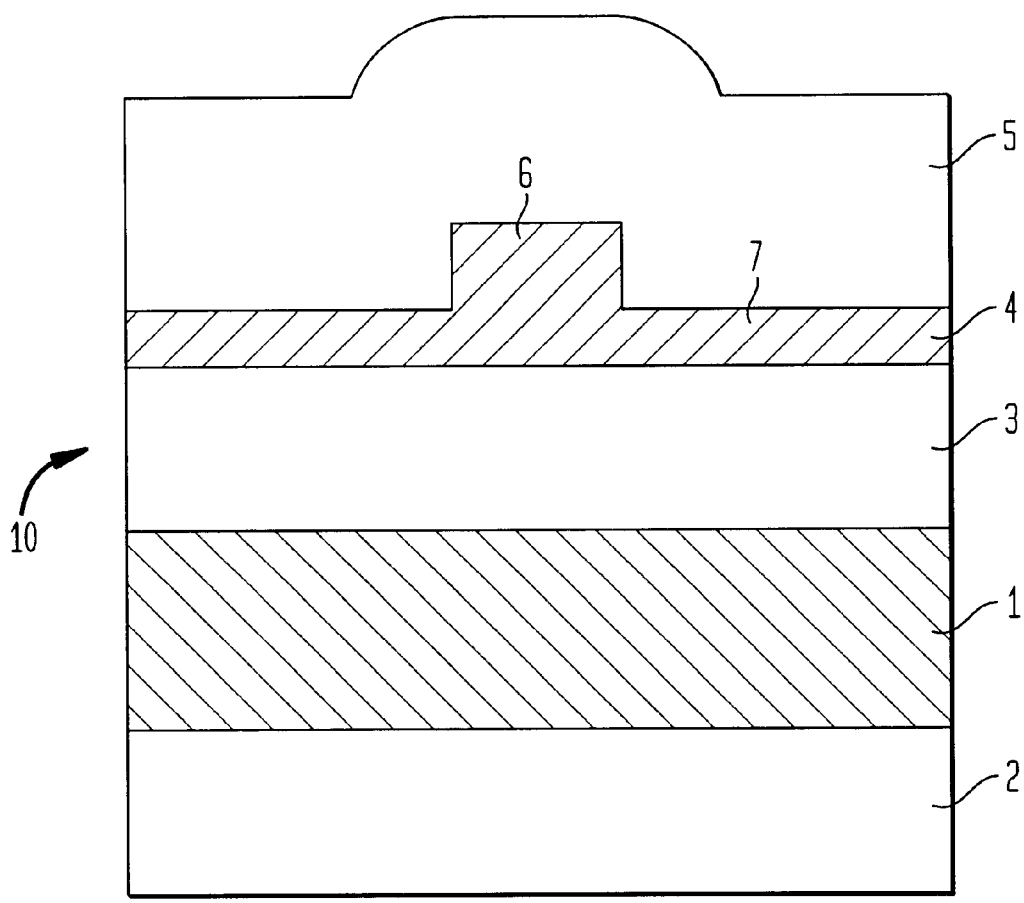

In FIG. 1 a cross-section of an optical waveguide is shown.

A silicon substrate 1 bears on both of its planar surfaces oxide layers, a lower oxide layer 2 and an upper oxide layer, the latter serving as lower cladding layer 3. Thereupon a waveguide core 4 made of SiliconOxyNitride ($SiON_x$) is arranged, comprising a core layer portion 7 and a core central portion 6 which extends upwards from the core layer portion 7. An upper cladding layer 5 made of SiO$_2$ completes the arrangement and covers the upper surface of the waveguide core 4. The arrangement in total is an optical device, namely an optical waveguide. In principle, the core layer portion 7 can also be omitted, which is known as a buried channel waveguide.

For the function as a waveguide, the lower cladding layer 3 has as a first refractive index n$_3$, and the upper cladding layer 5 has a second refractive index n$_5$, both being lower than a third refractive index n$_4$, which is the refractive index of the waveguide core 4.

The nitrogen content of the waveguide core material determines its refractive index. That is why the nitrogen content is fixed in a narrow range, when a predetermined refractive index has to be obtained. In order to eliminate N—H bonds in the SION material, a thermal annealing step is used to extract a significant amount of the hydrogen from the SiON material. The N—H bonds increase the optical losses because they give rise to optical absorption in the wavelength range around 1510 nm. The tail of this absorption peak extends into the optical signal transmission window which is ranging between 1530 nm and 1580 nm. After annealing, low losses are achieved, however also a stress remains as a negative side effect.

The cross sectional size of the central portion 6 can be several μm. The thickness of the cladding layer 3 can be between 10 to 20 μm. The thickness of the silicon substrate is typically of the order of 0.4 through 1 mm. In the practical case of a single mode optical waveguide with a SiON core and silica cladding, fabricated on a silicon substrate, a strong compressive stress of the order of several hundred MPa is built up during the first annealing step which removes hydrogen from the SiON core layer, so that the optical waveguide exhibits stress-induced birefringence.

The measured stress σ is composed of two components: the intrinsic stress, which is due to internal stresses caused by the deposition process (including the thermal history of the sample), and the thermal component, due to the different thermal expansion of the films and substrate. The thermal component σ$_t$ is given by $$\sigma_t = \left( \frac{E_f}{1-v_f} \int_{T_1}^{T_2} (a_s - a_f) dt \right) \quad (1)$$

where $$\frac{E_f}{1-v_f}$$

is the film elastic constant, and α$_s$ and α$_f$ are the thermal expansion coefficients for the substrate and film respectively and T$_1$ and T$_2$ are the initial and final temperatures. The upper temperature being such that stress is effectively relaxed.

Figure 2:
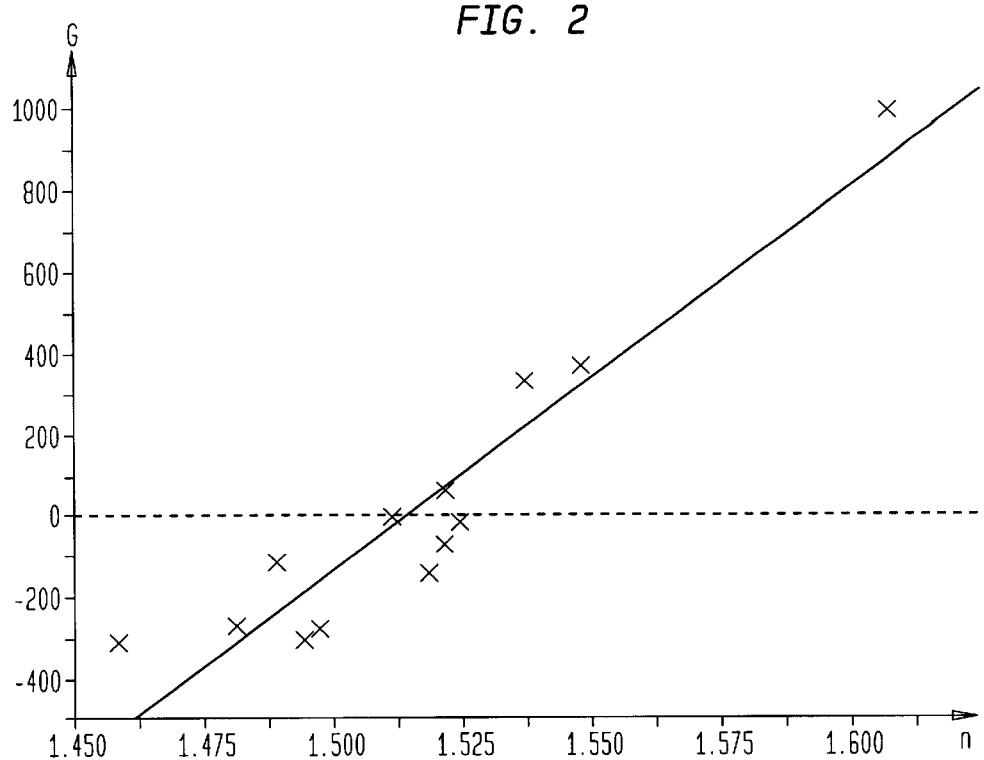

In FIG. 2 a schematic diagram of the dependence of stress in SiON on refractive index after annealing at 1145° C. is depicted. It can be seen that there exists a functional correspondence between stress and refractive index. There is also a direct correspondence between the refractive index and the nitrogen concentration in the film. The annealing process not only serves its main purpose of hydrogen-extraction but also influences the refractive index. This can be taken into account already when depositing the waveguide core, particularly by choosing the correct concentration x of nitrogen in the SiON material. As an example, a SiON film with refractive index of say 1.53, annealed at a temperature of 1140° C. to minimize the optical losses has a waveguide core stress of about 200 MPa, which is in the tensile stress range.

Birefringence induced by stress and in consequence polarisation-dependence of the optical devices have a detrimental effect on the overall performance of a communication system as pointed out previously.

The upper cladding layer is now supposed to compensate or at least reduce the stress and hence reduce the detrimental effects of birefringence and polarisation-dependency. Therefore the upper cladding layer 5 is subjected to an annealing step, hence a thermal treatment at a well defined temperature.

Figure 3:
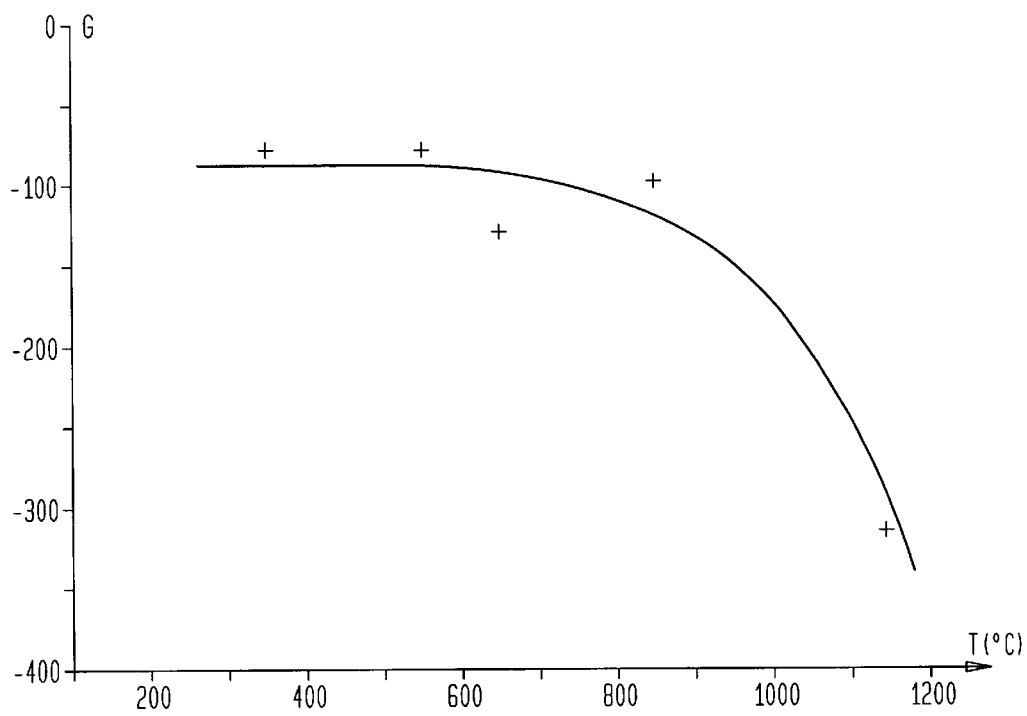

In FIG. 3 a schematic diagram of the resulting stress in SiO$_2$ depending on the annealing temperature is given. The stress range for silica is compressive and hence has a negative sign. This material is hence suited to partly or even fully compensate the tensile stress exerted by the waveguide core. Together with the geometrical waveguide birefringence this leads to a fully polarization-insensitive device.

For obtaining a total device stress of zero, the appropriate compressive stress value for the upper cladding layer 5 is to be chosen to compensate the tensile stress value for the core layer 4.

The following procedure is an example of a method for fabricating the multilayer waveguide structure shown in FIG. 1.

A Si wafer as the substrate 1 is thermally oxidised, so that the front- and backside surfaces have a uniform 7–9 μm SiO$_2$ thin film. On the frontside, the thin SiON waveguide core 4, with a higher refractive index n than the lower cladding layer 3 is deposited onto the thermal oxide. The wafer is then annealed at a high temperature, typically 1145° C., to remove hydrogen-induced absorption peaks and to consolidate the SiON material. The waveguide channel is then defined by conventional photolithography and Reactive Ion Etching. The upper SiO2 cladding layer is subsequently grown by PECVD. The wafer is annealed below 1000° C.

Using the above given equation (1), below the glass transition temperature, the thermal expansion coefficients do not vary with temperature, the thermal stress component a is compressive with a value given by: 3.5×10$^6$(T–T$_0$)dyn/cm$^2$, where T and T$_0$ are the temperature were the glass matrix is formed and measurement temperature respectively.

Considering the waveguide core material, in some multi-component materials, such as SiON, it is possible to change the stress by changing the material composition. In order to eliminate birefringence in the waveguide, it is advantageous to choose a ternary or other multi-component material whose two binary components mixed with different ratios can be compressive for one composition, and tensile for a different composition. For example, SiO$_2$ on Si is compressive whereas Si$_3$N$_4$ on Si is tensile: as the N concentration in SiO$_2$ is increased, the stress of the SiON on Si goes from compressive, to zero, to tensile. An increase in N concentration also results in an increase in the refractive index.

The wafer is annealed, such that then the composition and refractive index of zero stress can be found. The waveguide profile is etched and a PECVD SiO$_2$ cladding is deposited as the upper cladding layer 5.

Assuming the σ$_t$ of PECVD SiO$_2$ to be equal to that of thermal oxide, the PECVD oxide on the waveguide core 4 is under compressive stress. However, a low temperature annealing step can reduce this compressive stress. The intrinsic stress component results from the structural anisotropy in the oxide film. Upon annealing, the hydroxyl and hydride content is reduced. The $SiO_2$ undergoes densification through the formation of additional Si—O—Si bonds. As the material densifies, the refractive index increases, whereas the thickness does not change. The new bonding gives rise to strain, the intrinsic stress of the oxide film Surprisingly, over the 300° C. to 850° C. temperature range, the intrinsic component dominates over the change in thermal stress. The thermal component becomes increasingly compressive, however the intrinsic component is tensile. To confirm that the intrinsic stress after annealing is tensile, PECVD $SiO_2$ deposited on quartz was annealed at 850° C. The thermal mismatch between film and substrate can be assumed to be zero. The stress of PECVD $SiO_2$ on fused quartz as deposited is −300 MPa compressive, after 850° C. anneal it becomes 17 MPa tensile.

Beyond a certain temperature, the bond strains and intrinsic stress start relaxing. The bond network acquires sufficient mobility to rearrange locally and form a more compact SiO2. The net stress which below 850° C. is slightly compressive, becomes even more compressive above 1100° C. Also the thermal stress becomes increasingly compressive, as the intrinsic component starts to release. The refractive index decreases.

The thermal oxide on Si is under compressive stress. As deposited PECVD oxide on Si, is also under compressive stress. However, a low temperature anneal can reduce this compressive stress. To achieve zero birefringence, the upper and lower claddings of equal refractive index must have compensating stresses, or the waveguide core and upper cladding layers must have no stress. The stress of the waveguide core can be tuned by changing its refractive index. The stress of the upper cladding can be tuned by changing the annealing temperature.

What is claimed is:

1. Optical device with a defined total device stress ($\sigma_{10}$) and a therefrom resulting defined birefringence in order to obtain a well defined optical polarization dependence, comprising:

a) a lower cladding layer having a first refractive index ($n_3$), b) on said lower cladding layer an upper cladding layer having a second refractive index ($n_5$), c) between said lower cladding layer and said upper cladding layer an optical waveguide core having a third refractive index ($n_4$) which is bigger than said first refractive index ($n_3$) and said second refractive index ($n_5$), d) said optical waveguide core having a waveguide core stress ($\sigma_4$) resulting from the manufacturing process for said waveguide core, said manufacturing process comprising an annealing process, which preferably serves the extraction of hydrogen from the waveguide core.

e) wherein said upper cladding layer comprises material which is tuned to a selected cladding layer stress ($\sigma_5$) by variation of annealing temperature in an annealing process during manufacturing, said cladding layer stress ($\sigma_5$) together with said waveguide core stress ($\sigma_4$) resulting in said total device stress ($\sigma_{10}$).

2. Optical device according to claim 1 characterized in that the waveguide core has geometrical dimensions which give rise to birefringence.

3. Optical device according to claim 1, characterized in that the cladding layer stress ($\sigma_5$) is tunable to the tensile as well as to the compressive stress range.

4. Optical device according to one of claims 1 and 3 characterized in that the cladding layer stress ($\sigma_5$) is tuned to a value opposite the waveguide core stress ($\sigma_4$).

* * * * *